United States Patent
Mukherjee et al.

(10) Patent No.: US 10,223,279 B2
(45) Date of Patent: Mar. 5, 2019

(54) MANAGING VIRTUAL-ADDRESS CACHES FOR MULTIPLE MEMORY PAGE SIZES

(71) Applicant: Cavium, LLC, Santa Clara, CA (US)

(72) Inventors: Shubhendu Sekhar Mukherjee, Southborough, MA (US); Michael Bertone, Marlborough, MA (US); David Albert Carlson, Haslet, TX (US)

(73) Assignee: Cavium, LLC, Santa Clara, CA (US)

( * ) Notice: Subject to any disclaimer, the term of this patent is extended or adjusted under 35 U.S.C. 154(b) by 254 days.

(21) Appl. No.: 15/193,535

(22) Filed: Jun. 27, 2016

(65) Prior Publication Data

US 2017/0371799 A1    Dec. 28, 2017

(51) Int. Cl.
*G06F 12/0891* (2016.01)
*G06F 12/1027* (2016.01)

(52) U.S. Cl.
CPC ...... *G06F 12/0891* (2013.01); *G06F 12/1027* (2013.01); *G06F 2212/1021* (2013.01); *G06F 2212/281* (2013.01); *G06F 2212/608* (2013.01); *G06F 2212/68* (2013.01); *G06F 2212/683* (2013.01)

(58) Field of Classification Search
CPC ........ G06F 12/1027–12/1063; G06F 2212/68; G06F 2212/683
See application file for complete search history.

(56) References Cited

U.S. PATENT DOCUMENTS

| 5,542,062 | A | 7/1996 | Taylor et al. | |
|---|---|---|---|---|
| 5,751,990 | A | 5/1998 | Krolak et al. | |
| 6,493,812 | B1 * | 12/2002 | Lyon | G06F 12/1054 711/108 |
| 7,802,055 | B2 | 9/2010 | Sartorius et al. | |
| 2007/0250666 | A1 | 10/2007 | Sartorius et al. | |
| 2011/0283040 | A1 * | 11/2011 | Chadha | G06F 12/1009 711/3 |
| 2012/0137079 | A1 | 5/2012 | Ueda | |
| 2015/0089184 | A1 * | 3/2015 | Mukherjee | G06F 12/1036 711/206 |
| 2016/0140042 | A1 | 5/2016 | Mukherjee | |

OTHER PUBLICATIONS

Cekleov et al., "Virtual-Address Caches—Part 1: Problems and Solutions in Uniprocessors" IEEE Micro, 1997—p. 64-71.

* cited by examiner

*Primary Examiner* — Nicholas J Simonetti
(74) *Attorney, Agent, or Firm* — Young Basile Hanlon & MacFarlane, P.C.

(57) ABSTRACT

A translation lookaside buffer stores information indicating respective page sizes for different translations. A virtual-address cache module manages entries, where each entry stores a memory block in association with a virtual address and a code representing at least one page size of a memory page on which the memory block is located. The managing includes: receiving a translation lookaside buffer invalidation instruction for invalidating at least one translation lookaside buffer entry in the translation lookaside buffer, where the translation lookaside buffer invalidation instruction includes at least one invalid virtual address; comparing selected bits of the invalid virtual address with selected bits of each of a plurality of virtual addresses associated with respective entries in the virtual-address cache module, based on the codes; and invalidating one or more entries in the virtual-address cache module based on the comparing.

24 Claims, 5 Drawing Sheets

MANAGING VIRTUAL-ADDRESS CACHES FOR MULTIPLE MEMORY PAGE SIZES

BACKGROUND

This description relates to managing virtual-address caches for multiple memory page sizes.

Modern processors support 'virtual memory', which allows program instructions being executed by a CPU to refer to virtual addresses within a 'virtual address space' that is larger than a 'physical address space' that is defined by the size of main memory. Virtual memory involves address translation from one or more such virtual address spaces into a physical address space. The translation is performed using a 'page table' that stores mappings between virtual addresses and physical addresses (also called 'translations') at a granularity of memory pages (or simply 'pages'). The lowest order bits of the virtual address and physical address, called the 'page offset', are typically identical, such that data occurring at a particular location in a virtual page occurs at the same relative location in a corresponding physical page.

Many modern processors also support hierarchical cache systems with multiple levels of cache, including one or more levels within the processor or within each core of a multi-core processor, starting with a level one (L1) cache, and one or more levels external to the processor or cores, up to a last level cache (LLC) that is accessed just before main memory is accessed. At each level of the hierarchy, the cache stores copies of a subset of data to speed access to that data by the processor relative to the speed of a higher level cache (or relative to the speed of the main memory for the LLC). Lower level caches are closer to the processor (or core), whereas higher level caches are further away from the processor (or core). The LLC is typically shared by all of the cores of a multi-core processor. At each level, the cache system will load blocks of data into entries and evict blocks of data from entries in units of 'memory blocks' (also called 'cache lines' or 'cache blocks'). Each memory block includes a number of 'words' of data, each word consisting of a predetermined number of bytes. A memory page typically has data from many memory blocks.

A cache that is accessed using at least a portion of a virtual address and in some cases additional information such as context information (e.g., a virtual machine identifier, and an address space identifier, etc.) is referred to herein as a 'virtual-address cache' or 'VA cache'. Examples of a VA cache include caches that are accessed using an index and a tag, where the index is a portion of a virtual address and the tag is either another portion of the virtual address (in a virtually indexed, virtually tagged (VIVT) cache) or a portion of a corresponding physical address (in a virtually indexed, physically tagged (VIPT) cache). A VIVT cache is sometimes called a 'virtual cache'. For example, in a set associative VIVT cache, the tag is typically taken from the highest order bits of a virtual address, with the index taken from the middle bits, leaving the lowest order bits for use as a 'block offset' to select a word within a memory block. Since memory blocks are smaller than memory pages, a block offset would consist of a subset of low order bits of a page offset.

SUMMARY

In one aspect, in general, a method includes: storing memory pages in a main memory based on virtual addresses translated to physical addresses, where translations between virtual addresses and physical addresses are stored in a translation lookaside buffer, and information indicating respective page sizes for different translations, selected from a set of multiple different pages sizes, is stored in the translation lookaside buffer; and storing, in one or more cache modules, copies of memory blocks located on memory pages stored in the main memory. At least one of the cache modules comprises a virtual-address cache module that manages entries, where each entry stores a memory block in association with a virtual address and a code representing at least one page size of a memory page on which the memory block is located. The managing includes: receiving a translation lookaside buffer invalidation instruction for invalidating at least one translation lookaside buffer entry in the translation lookaside buffer, where the translation lookaside buffer invalidation instruction includes at least one invalid virtual address; comparing selected bits of the invalid virtual address with selected bits of each of a plurality of virtual addresses associated with respective entries in the virtual-address cache module, based on the codes; and invalidating one or more entries in the virtual-address cache module based on the comparing.

In another aspect, in general, an apparatus includes: memory management circuitry configured to store memory pages in a main memory based on virtual addresses translated to physical, where translations between virtual addresses and physical addresses are stored in a translation lookaside buffer; and information indicating respective page sizes for different translations, selected from a set of multiple different pages sizes, is stored in the translation lookaside buffer; and a memory system including one or more cache modules that store copies of memory blocks located on memory pages stored in the main memory. At least one of the cache modules comprises a virtual-address cache module that manages entries, where each entry stores a memory block in association with a virtual address and a code representing at least one page size of a memory page on which the memory block is located. The managing includes: receiving a translation lookaside buffer invalidation instruction for invalidating at least one translation lookaside buffer entry in the translation lookaside buffer, where the translation lookaside buffer invalidation instruction includes at least one invalid virtual address; comparing selected bits of the invalid virtual address with selected bits of each of a plurality of virtual addresses associated with respective entries in the virtual-address cache module, based on the codes; and causing invalidation of one or more entries in the virtual-address cache module based on the comparing.

Aspects can include one or more of the following features.

There are M different codes, where M>1, and the comparing includes performing at most M iterations of comparisons, where each iteration is performed for a different value of the code, and each iteration accesses a different set of entries that all store the same value of the code for which that iteration is being performed.

In a first iteration, comparing first selected bits of the invalid virtual address with first selected bits of each of the virtual addresses associated with respective entries in a first set of entries that all store a first value of the code, where the first selected bits depend on a page size represented by the first value of the code.

If no match is found in the first iteration, a second iteration includes comparing second selected bits of the invalid virtual address with second selected bits of each of the virtual addresses associated with respective entries in a second set of entries that all store a second value of the code, where the second selected bits depend on a page size represented by the second value of the code.

If no match is found in the first M−1 iterations, a last iteration includes invalidating all entries in a last set of entries that all store the same value of the code.

If one or more matches are found in one of the iterations, each entry for which a match is found, based on a comparison of selected bits, is invalidated.

No further iterations are performed after the first iteration in which one or more matches are found.

There are N different page sizes, and M<N.

Each code uniquely represents a different page size, and the comparing includes comparing first selected bits of the invalid virtual address with first selected bits of each of the virtual addresses associated with respective entries in the virtual-address cache module, where the first selected bits are determined by using the code as a mask that depends on a page size represented by the code.

The virtual-address cache module is one of a data cache, an instruction cache, or a page table walker cache.

The virtual-address cache module is configured to receive at least a portion of a virtual address and in response indicate a hit if a memory block associated with a corresponding virtual address is presently stored in the virtual-address cache module without requiring translation of the corresponding virtual address to a physical address.

The virtual-address cache module is virtually tagged such that the virtual-address cache module determines whether to indicate a hit or a miss for a particular virtual address based on a tag that includes a portion of the particular virtual address and is compared with tags of multiple entries.

The virtual-address cache module is virtually indexed such that the virtual-address cache module determines whether to indicate a hit or a miss for a particular virtual address based on an index that includes a portion of the particular virtual address and is used to look up one of multiple entries or sets of entries.

Aspects can have one or more of the following advantages.

The use of VA caches, especially for low level caches such as an L1 data cache, lowers the cache hit latency, because a virtual-to-physical address translation can be avoided, at least for the initial indexing, and possibly avoided completely such as for a VIVT cache. But, the use of VA caches calls for management when a virtual-to-physical address translation is changed. When a translation is changed, in addition to updating the page table, any copy that translation that may be stored in a translation lookaside buffer (TLB) needs to be invalidated. In some processor architectures, such translation invalidations are performed using the TLB Invalidate (TLBI) instructions, which may be broadcast to each processor core in a multi-core computing system. Some TLBI instructions invalidate translations for virtual addresses implicitly (e.g., based on context or other information), and some TLBI instructions, called 'address-based' TLBI instructions, invalidate translations for virtual addresses by explicitly indicating an actual address whose translation (i.e., for a particular memory page) is now invalid.

In addition to invalidating the translations themselves, the system also needs to invalidate entries in a VA cache that correspond to virtual addresses whose translation is being invalidated. But, because there is a mismatch between granularity at which translation occurs (i.e., memory pages) and the granularity at which caching occurs (i.e., memory blocks), part of the management of a VA cache involves determining which memory blocks are included on a memory page that is being invalidated. For architectures in which there is a single fixed page size, this task may involve simply using the appropriate bits that correspond to a virtual page number. But, for architectures in which there may be multiple possible pages sizes, this task is more complicated.

For example, cached memory blocks may have a fixed size of any size between about 32 bytes to 128 bytes, whereas memory pages may have one of a set of multiple different pages sizes, such as 4 kilobytes (KB), 16 KB, and 64 KB. Some architectures may even support pages sizes as large as around 512 megabytes (MB) or even 16 gigabytes (GB). When an address-based TLBI instruction arrives at a processor core's cache module, one option would be to simply invalidate the entire cache, but such over-invalidation may be detrimental, especially if none of the memory blocks resident in the cache module were actually located in the memory page whose translation was being invalidated. Instead of invalidating the entire cache, the page size, typically located in the TLB, can be used to reduce (or eliminate entirely) the amount of over-invalidation that occurs for address-based TLBI instructions. There are several techniques that can be used to precisely or semi-precisely invalidate cached memory blocks in response to an address-based TLBI, as described in more detail below.

Other features and advantages of the invention will become apparent from the following description, and from the claims.

DESCRIPTION

Figure 1:
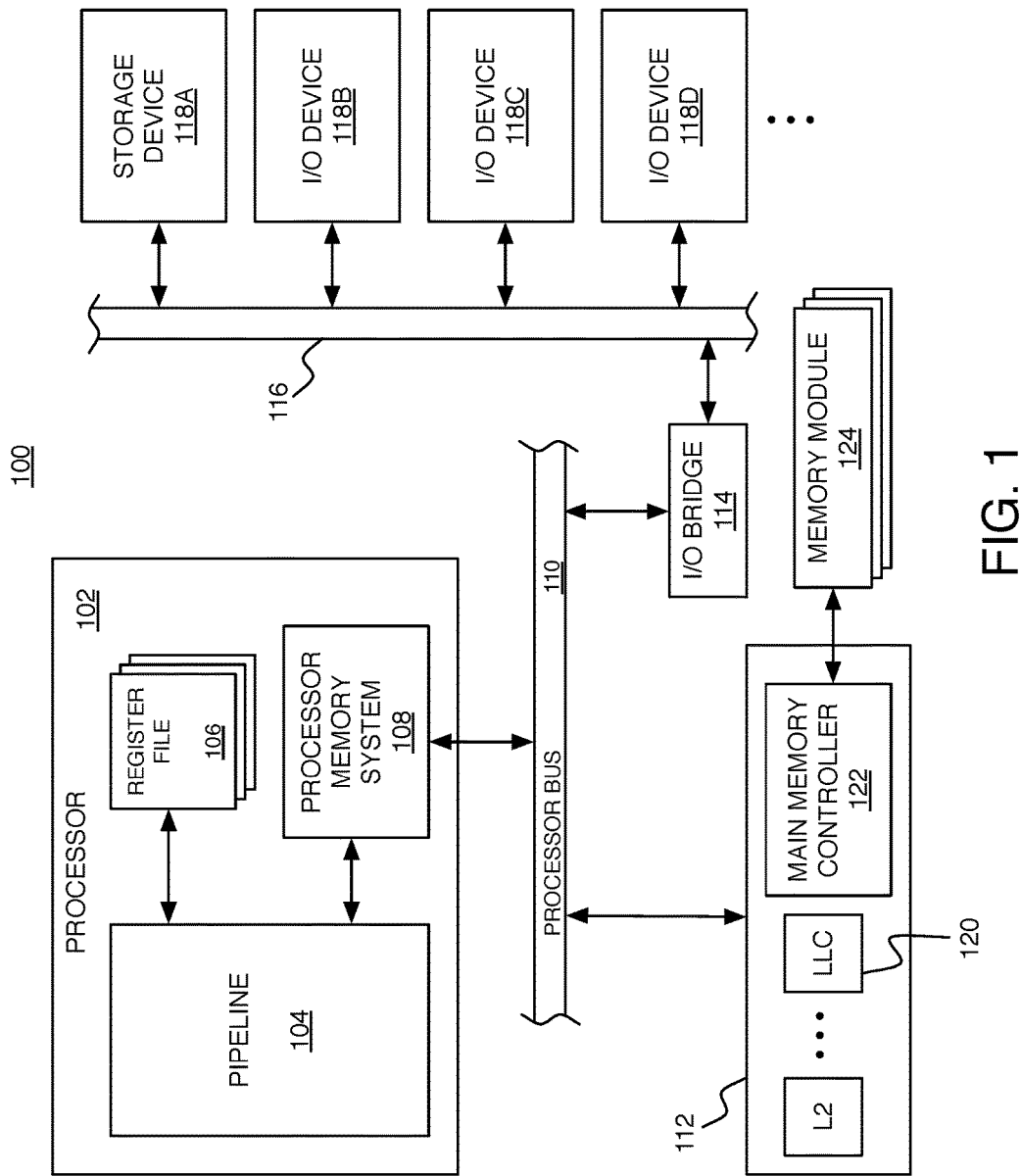
FIG. 1 is a schematic diagram of a computing system.

FIG. 1 shows an example of a computing system 100 in which the VA cache management techniques can be used. The system 100 includes at least one processor 102, which could be a single central processing unit (CPU) or one of multiple processor cores of a multi-core architecture. In this example, the processor 102 includes a pipeline 104, one or more register files 106, and a processor memory system 108. The processor 102 is connected to a processor bus 110, which enables communication with an external memory system 112 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 112 together form a hierarchical cache system including at least a first level (L1) cache within the processor memory system 108, and any number of higher level (L2, L3, . . . ) caches within the external memory system 112. The highest level cache within the external memory system 112 (which may be the L2 cache if there are only two levels in the hierarchy) is the last level cache (LLC) 120, which is accessed just before main memory. Of course, this is only an example. The exact division between which level caches are within the processor memory system 108 and which are in the external memory system 112 can be different in other examples. For example, the L1 cache and the L2 cache could both be internal to the processor 102, and the L3 (and higher) caches could be external to the processor 102. If the processor 102 is a multi-core processor, each core could have its own internal L1 cache, and the cores could share an L2 cache. The external memory system 112 also includes a main memory controller 122, which is connected to any number of memory modules 124 serving as main memory (e.g., Dynamic Random Access Memory modules).

Figure 2:
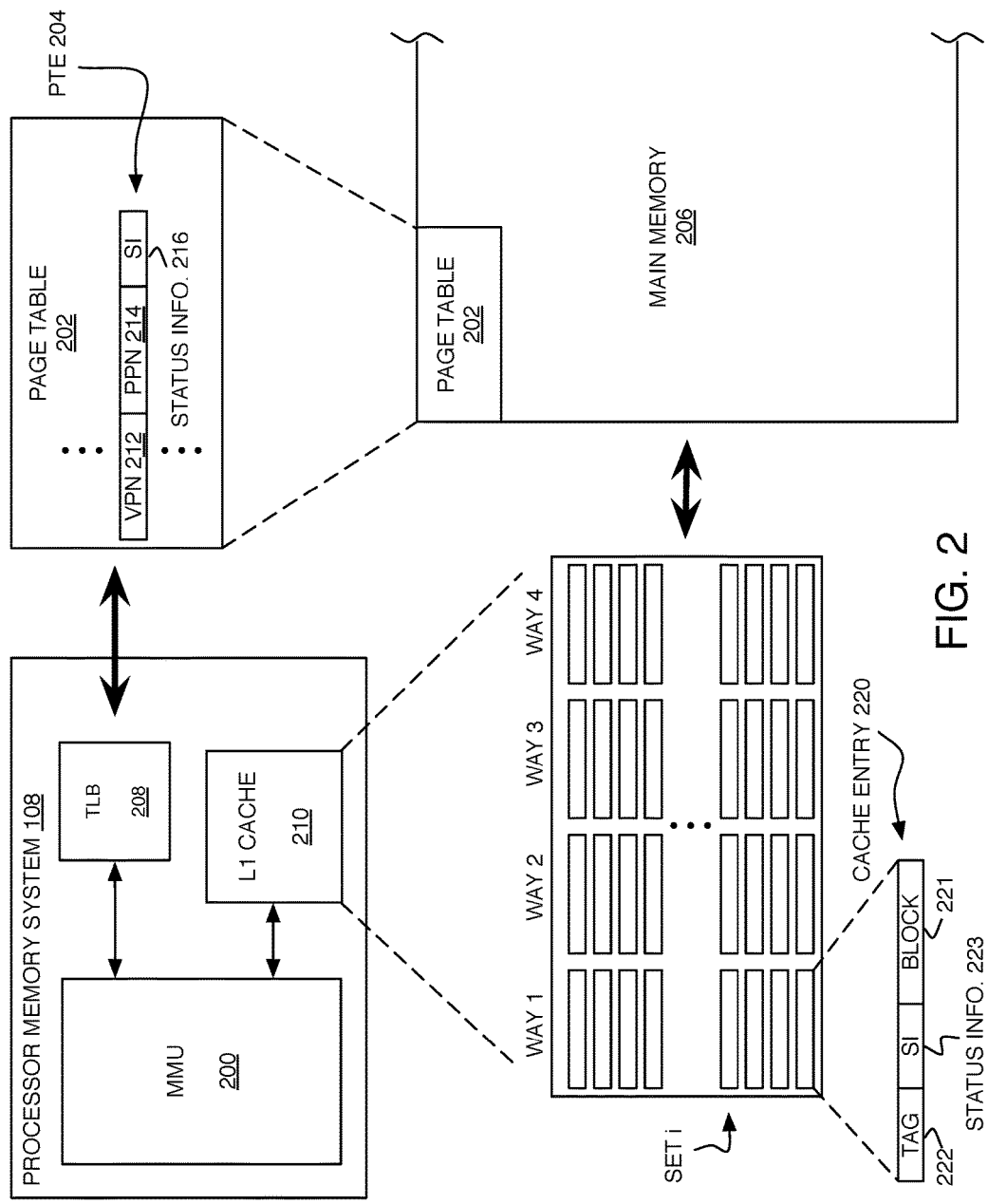
FIG. 2 is a schematic diagram of a processor memory system managing virtual memory and a hierarchical cache system.

FIG. 2 illustrates an example implementation of the processor memory system 108 configured to manage virtual memory and the hierarchical cache system. The processor memory system 108 includes a memory management unit (MMU) 200 that manages the translation of virtual addresses to physical addresses. A page table 202 has entries that store VA-to-PA mappings, called a page table entry (PTE) 204. The page table 202 is typically stored in main memory 206 along with physical memory pages that represent corresponding mapped virtual memory pages that have been 'paged in' from secondary storage (e.g., storage device 118A). Alternatively, in a virtualized system with one or more guest operating systems managed by a hypervisor, virtual addresses (VAs) may be translated to intermediate physical addresses (IPAs), which are translated to physical addresses (PAs). In a virtualized system, the translation by a guest operating system of VAs to IPAs may be handled entirely in software, or the guest operating system may have some hardware assistance from the MMU 200.

The processor memory system 108 also includes a translation lookaside buffer (TLB) 204 for caching frequently used page table entries from the page table 202. This enables the translation to be performed without necessarily having to access the main memory 206 to retrieve a PTE 204. The processor memory system 108 also includes an L1 cache 210, and various other circuitry for handling a miss in either the TLB 208 or the L1 cache 210. When a load or store instruction is executed, the TLB 208 is used to translate a memory address indicated by that instruction (from a VA to a PA). The processor 102 also determines whether a copy of the data from that memory address is in any of the levels of the hierarchical cache system, from the L1 cache 210 up to an LLC if necessary. If so, that instruction can be executed from the cache system. If not, that instruction can be handled by miss circuitry so that it may be executed after accessing main memory 206 directly.

In this example, a PTE 204 of the page table 202 stores a virtual page number 212 and a physical page number 214, which serve as a mapping between a VA and a PA that defines a translation of that VA. The low order bits consisting of the page offsets are identical for a VA and its mapped PA, which leaves the high order bits consisting of the page numbers to specify the mapping. The PTE 204 also includes status information 216, such as information indicating whether or not the page is resident in main memory 206 or needs to be retrieved from secondary storage. When the PTE 204 is stored in the TLB 208, there may also be additional information for managing the transfer of PTEs between a full page table 202 and the TLB 208, and for invalidating PTEs in the TLB (e.g., by toggling a valid bit).

For the invalidation techniques described herein, the VA cache module could be a data cache, instruction cache, or a page table walker cache, for example. Also, the invalidation techniques could be applied to one or more types of TLB, such as a micro TLB or macro TLB, which also use virtual addresses to find matches. Also, the VA cache module could be located at a different level of the hierarchy other than the lowest L1 level.

In this example, the L1 cache 210 is a VA cache module implemented as an N-way set associative cache. Each cache entry 220 includes bits for storing a particular memory block 221 that has been copied from a physical page in the main memory 206 (possibly via higher level cache module). The cache entry 220 also includes bits for storing a tag 222 made up of a number of the most significant bits of a virtual address, which are common to the words of that entry. For a VIVT type of VA cache module, in addition to comparing a tag portion of an address of desired data, the cache module compares an index portion of the address, made up of middle bits between the tag and the block offset, to determine in which of multiple sets may have a cache entry containing that desired data. For an N-way set associative cache, the tag comparison is performed N times (possibly in parallel) for the selected set (i), once for each of N 'ways' in which a memory block containing the desired data may be stored (where N=4 in FIG. 2). The block offset is then used to select a particular word from a memory block that is found in the cache entry (i.e., a 'cache hit'). If the tag does not match for any of the ways of the selected set (i.e., a 'cache miss'), then the cache system attempts to retrieve the memory block from a higher level cache, or from the main memory (in the case of the LLC).

The cache entry 220 also includes bits for storing status information 223. The status information 223 may include, for example, a valid bit and any flags or error correction bits. The status information 223 also includes a 'code' for use in the invalidation techniques described herein. This code represents at least one page size of a memory page on which the memory block 221 is located. In some embodiments, there is a one-to-one correspondence between codes and pages sizes, where each code uniquely represents a different page size, and bits are selected for determining 'masked address matches' by using the code as a mask that corresponds to that page size, as described in more detail below. In other embodiments, there is not a one-to-one correspondence between codes and page sizes, where some codes uniquely represent different page sizes, and another code represents multiple page sizes, as described in more detail below.

Figure 3:
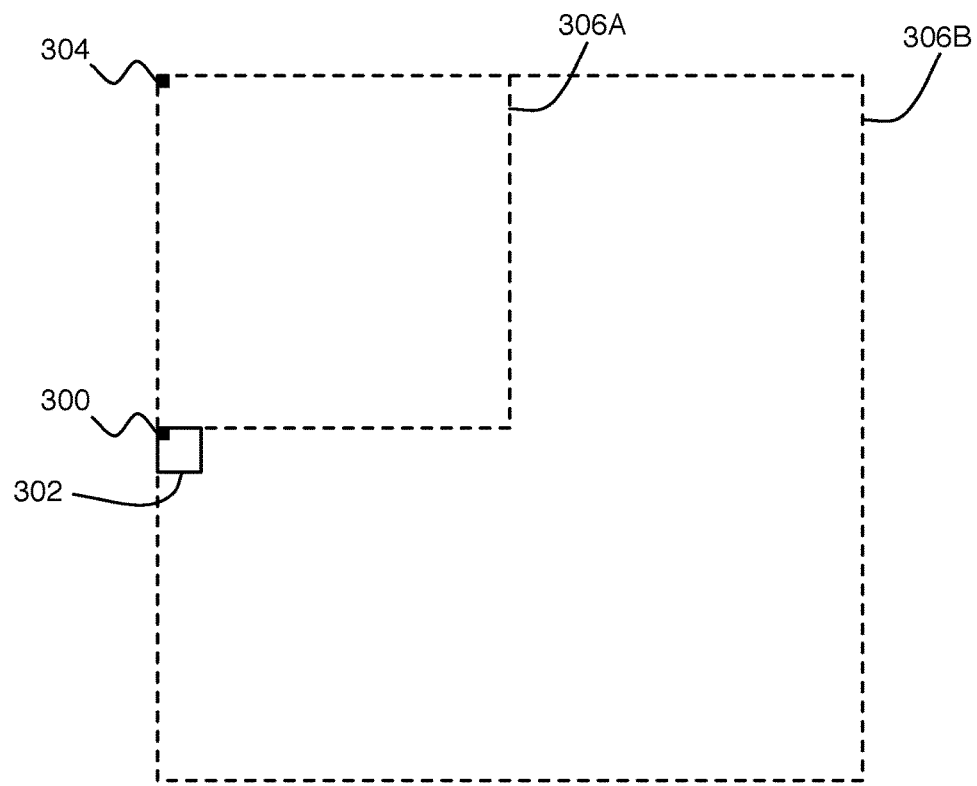
FIG. 3 is a diagram illustrating a cached memory block location with respect to different memory page sizes.

FIG. 3 shows an example of the dependence on page size for determining whether or not an virtual address 300 corresponding to a cached memory block 302 is located on a page corresponding to an invalid virtual address 304. (For illustration purposes only, FIG. 3 shows memory pages and memory blocks having two-dimensional extent, but actual addresses vary over a one-dimensional range of binary values. However, the same principles apply.) The virtual address 300 or 302 representing a particular word (e.g., 32-bit words) is assumed to correspond to the first word on the block or page, respectively, having a block or page offset of all zeros, with the remaining words on that block or page having higher block or page offsets. The answer to the question of whether or not the memory block 302 is within the memory page corresponding to the virtual address 304 being invalidated depends on the page size. In this example, for a first page size of a memory page 306A, the answer is "no" because the memory block 302 is not within the smaller memory page 306A; for a second page size of a memory page 306B, the answer is "yes" because the memory block 302 is within the larger memory page 306B. Of course, in other examples the answers may be different.

Figure 4A:
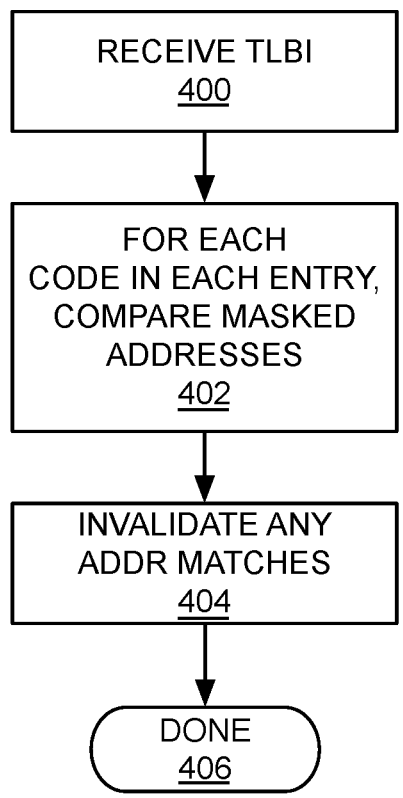
FIGS. 4A and 4B are flowcharts of example procedures for managing a VA cache module.

FIG. 4A shows a flowchart for an example procedure implementing a 'stored-mask code processing' approach. In this approach, the code stored in the status information 223 of the cache entry 220 consists of a bit mask that enables selection of the bits that represent the page number for a particular assumed page size. For example, if the virtual address for a memory block being installed in the VA cache module (at miss time) has a page size of 4K (e.g., as indicated by the TLB), then the code is a bit mask that selects all upper bits excluding the lower 12 bits (in hexadecimal notation, such a bit mask is represented by ~0xFFF), since the page offset for a 4K memory page needs exactly 12 bits. One way to accomplish this selection is to perform a bitwise logical 'AND operation' between the bits of the bit mask and the bits of the address being masked. The resulting bits of a masked cache entry address can then be compared to the resulting bits of a masked address being invalidated, as described in more detail below.

Referring to FIG. 4A, in the stored-mask processing approach, the VA cache module receives (400) an address-based TLBI instruction that includes a particular invalid virtual address. The VA cache module then traverses all cache entries, and for each code in each entry, uses that code as a mask to compare (402) the masked cache entry virtual address with the masked invalid virtual address. For any comparison in which there is a match between the masked addresses (i.e., a 'masked address match'), the VA cache module invalidates (404) that entry (e.g., by toggling a valid bit). After a full pass through all of the cache entries, this example procedure implementing the stored-mask processing approach is done (406).

This stored-mask processing approach would allow for precise invalidation, without the need for over-invalidation. But, the number of bits in the status information 223 that need to be reserved for storing a code that directly encodes the full bit mask (e.g., by storing just the nonzero bits of the bit mask) is the number of nonzero bits in the bit mask for the smallest page size (e.g., the full size of the virtual address minus 12 bits if the smallest page size is 4K). This can be a large number of bits for long addresses (e.g., 64-bit addresses).

Figure 4B:
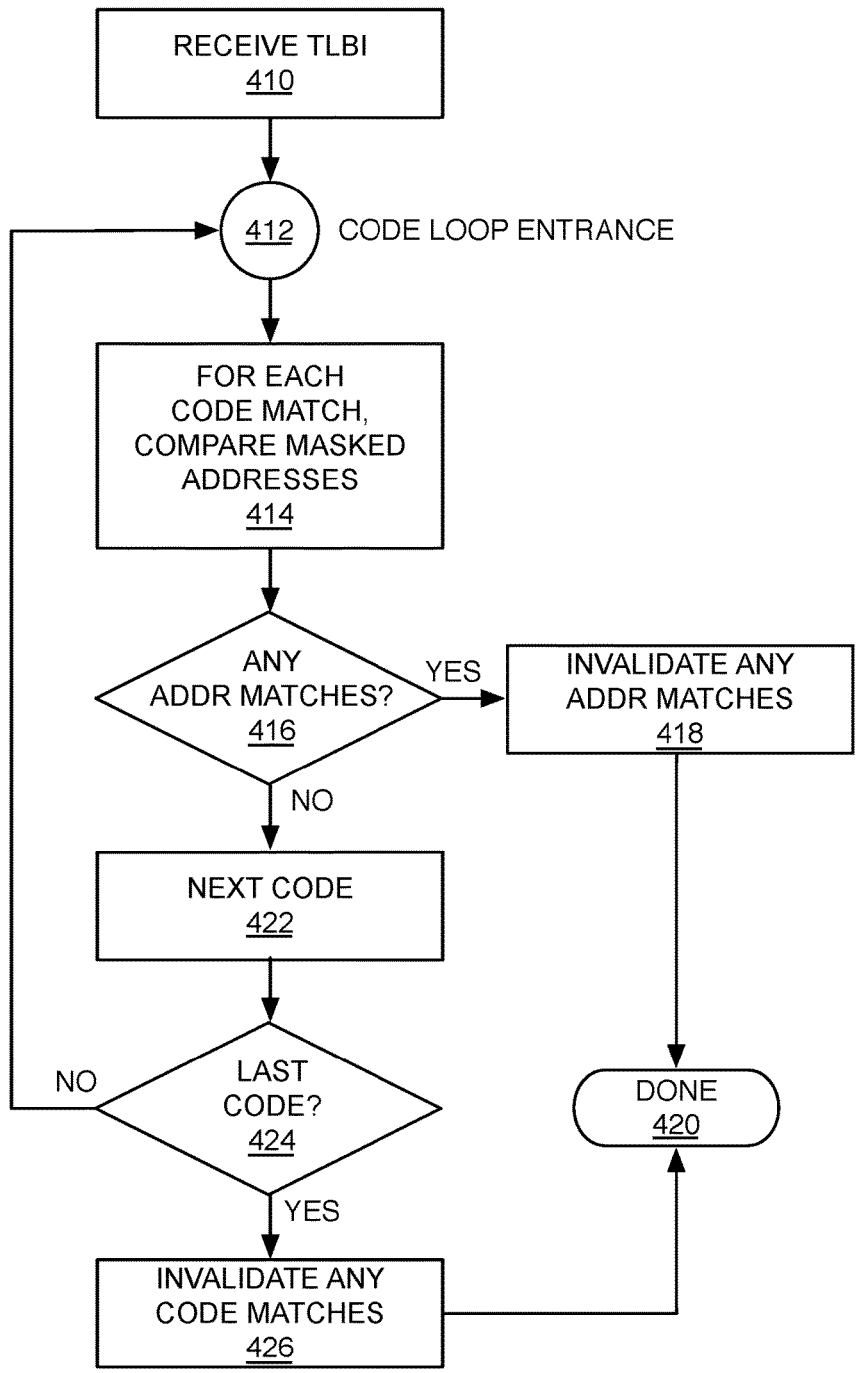

FIG. 4B, shows a flowchart for an example procedure implementing a 'mask-lookup code processing' approach. Instead of requiring enough bits in the status information 223 for a code that corresponds to a full representation of a bit mask, the VA cache module is able to store a code consisting of a smaller number of bits that map to a particular page size in a stored lookup table (e.g., stored in the processor memory system 108). For example, in an example in which there are more than four allowed pages sizes that could be used by the virtual memory system, three of the smallest allowed page sizes 4K, 16K, and 64K (and their corresponding bit masks) are mapped uniquely to the following respective 2-bit code values:

00 code value: 4K page size (using a ~0xFFF bit mask)
01 code value: 16K page size (using a ~0x3FFF hit mask)
10 code value: 64K page size (using a ~0xFFFF bit mask)
All of the other pages sizes (e.g., two or more other pages sizes) are then mapped collectively to the same last 2-bit code value:
11 code value: all pages sizes larger than 64K (no bit mask needed)

In this mask-lookup code processing approach, the code stored in the status information 223 of the cache entry 220 consists of one of the assigned 2-bit values that enables either (1) the appropriate bit mask to be looked up for selection of the bits that represent the page number for a particular assumed page size for use in invalidation, or (2) invalidation of all cache entries with the last code value, if the last code value is used. For example, if the virtual address for a memory block being installed in the VA cache module (at miss time) has a page size of 4K (e.g., as indicated by the TLB), then the code value is 00. In this example, precise invalidation occurs for the first three page sizes, and over-invalidation is potentially possible only for larger page sizes.

Referring to FIG. 4B, in the mask-lookup code processing approach, the VA cache module receives (410) an address-based TLBI instruction that includes a particular invalid virtual address. The VA cache module then enters a 'code loop' that iterates (412) a CODE variable over the possible code values (e.g., 00, 01, 10, 11), starting at the initial value (i.e., CODE=00). The VA cache module traverses the cache entries to find any matches between the CODE variable and the stored code value in the entry (i.e., a 'code match'). For each code match, the VA cache module uses the matched code value to look up the corresponding bit mask from the lookup table, and uses that mask to compare (414) the masked cache entry virtual address with the masked invalid virtual address.

If there are one or more such masked address matches (416—"YES"), then the VA cache module invalidates (418) those entries, and no further iterations of the CODE variable are performed, indicating that this example procedure for implementing the mask-lookup code processing approach is done (420). The reason the procedure is able to exit the code loop without further iterations in this case is because only one code value will correspond to the correct page size (i.e., the actual size of the page actually containing a given memory block), and only the correct page size will generate any masked address matches. The assumption under which this is true is that the virtual memory system does not assign overlapping memory pages. So, if a memory block is contained within a memory page starting at particular location and having a particular size, then that memory block cannot also be contained within (an overlapping) memory page starting at that particular location and having a different size.

If there are no masked address matches (416—"NO"), then the VA cache module increments the CODE variable to the next code value (422). As long as the incremented code value is not the last code value (424—"NO"), then the VA cache module returns for another iteration of the code loop (412). But, if the incremented code value is the last code value (424—"YES"), then the VA cache module traverses the cache entries and invalidates any code matches between the CODE variable and the stored code value in the entry. After that pass through the cache entries, this example procedure for implementing the mask-lookup processing approach is done (420).

Other embodiments may fall within the scope of the following claims, which do not necessarily include all of the features or advantages of the embodiments described above. For example, other approaches for processing codes are also possible. Any number of page sizes can be represented by codes using any of a variety of mappings between codes and masks, or between codes and any other representation of page size. In some embodiments, the comparisons for determining one or both of the masked address match and/or the code match can be performed in parallel.

What is claimed is:
1. A method comprising:
storing memory pages in a main memory based on virtual addresses translated to physical addresses, where trans- lations between virtual addresses and physical addresses are stored in a translation lookaside buffer, and information indicating respective page sizes for different translations, selected from a set of multiple different pages sizes, is stored in the translation lookaside buffer; and storing, in one or more cache modules, copies of memory blocks located on memory pages stored in the main memory;

wherein at least one of the cache modules comprises a virtual-address cache module that manages entries, where each entry stores a memory block in association with a virtual address and a code representing at least one page size of a memory page on which the memory block is located, where at least two different codes correspond to different page sizes, and where the managing includes:

receiving a translation lookaside buffer invalidation instruction for invalidating at least one translation lookaside buffer entry in the translation lookaside buffer, where the translation lookaside buffer invalidation instruction includes at least one invalid virtual address;

comparing selected bits of the invalid virtual address with selected bits of each of a plurality of virtual addresses associated with respective entries in the virtual-address cache module, based on the codes wherein there are M different codes, where M>1, and the comparing includes performing at most M iterations of comparisons, where each iteration is performed for a different value of the code, and each iteration accesses a different set of entries that all store the same value of the code for which that iteration is being performed; and invalidating one or more entries in the virtual-address cache module based on the comparing.

2. The method of claim 1, wherein in a first iteration, comparing first selected bits of the invalid virtual address with first selected bits of each of the virtual addresses associated with respective entries in a first set of entries that all store a first value of the code, where the first selected bits depend on a page size represented by the first value of the code.

3. The method of claim 2, wherein if no match is found in the first iteration, a second iteration includes comparing second selected bits of the invalid virtual address with second selected bits of each of the virtual addresses associated with respective entries in a second set of entries that all store a second value of the code, where the second selected bits depend on a page size represented by the second value of the code.

4. The method of claim 2, wherein if no match is found in the first M−1 iterations, a last iteration includes invalidating all entries in a last set of entries that all store the same value of the code.

5. The method of claim 1, wherein if one or more matches are found in one of the iterations, each entry for which a match is found, based on a comparison of selected bits, is invalidated.

6. The method of claim 5, wherein no further iterations are performed after the first iteration in which one or more matches are found.

7. The method of claim 1, wherein there are N different page sizes, and M<N.

8. The method of claim 1, wherein each code uniquely represents a different page size, and the comparing includes comparing first selected bits of the invalid virtual address with first selected bits of each of the virtual addresses associated with respective entries in the virtual-address cache module, where the first selected bits are determined by using the code as a mask that depends on a page size represented by the code.

9. The method of claim 1, wherein the virtual-address cache module is one of: a data cache, an instruction cache, or a page table walker cache.

10. The method of claim 1, wherein the virtual-address cache module is configured to receive at least a portion of a virtual address and in response indicate a hit if a memory block associated with a corresponding virtual address is presently stored in the virtual-address cache module without requiring translation of the corresponding virtual address to a physical address.

11. The method of claim 10, wherein the virtual-address cache module is virtually tagged such that the virtual-address cache module determines whether to indicate a hit or a miss for a particular virtual address based on a tag that includes a portion of the particular virtual address and is compared with tags of multiple entries.

12. The method of claim 11, wherein the virtual-address cache module is virtually indexed such that the virtual-address cache module determines whether to indicate a hit or a miss for a particular virtual address based on an index that includes a portion of the particular virtual address and is used to look up one of multiple entries or sets of entries.

13. An apparatus comprising:

memory management circuitry configured to store memory pages in a main memory based on virtual addresses translated to physical, where translations between virtual addresses and physical addresses are stored in a translation lookaside buffer, and information indicating respective page sizes for different translations, selected from a set of multiple different pages sizes, is stored in the translation lookaside buffer; and a memory system including one or more cache modules that store copies of memory blocks located on memory pages stored in the main memory;

wherein at least one of the cache modules comprises a virtual-address cache module that manages entries, where each entry stores a memory block in association with a virtual address and a code representing at least one page size of a memory page on which the memory block is located, where at least two different codes correspond to different page sizes, and where the managing includes:

receiving a translation lookaside buffer invalidation instruction for invalidating at least one translation lookaside buffer entry in the translation lookaside buffer, where the translation lookaside buffer invalidation instruction includes at least one invalid virtual address;

comparing selected bits of the invalid virtual address with selected bits of each of a plurality of virtual addresses associated with respective entries in the virtual-address cache module, based on the codes wherein there are M different codes, where M >1, and the comparing includes performing at most M iterations of comparisons, where each iteration is performed for a different value of the code, and each iteration accesses a different set of entries that all store the same value of the code for which that iteration is being performed; and causing invalidation of one or more entries in the virtual-address cache module based on the comparing.

14. The apparatus of claim 13, wherein in a first iteration, comparing first selected bits of the invalid virtual address with first selected bits of each of the virtual addresses associated with respective entries in a first set of entries that all store a first value of the code, where the first selected bits depend on a page size represented by the first value of the code.

15. The apparatus of claim 14, wherein if no match is found in the first iteration, a second iteration includes comparing second selected bits of the invalid virtual address with second selected bits of each of the virtual addresses associated with respective entries in a second set of entries that all store a second value of the code, where the second selected bits depend on a page size represented by the second value of the code.

16. The apparatus of claim 14, wherein if no match is found in the first M−1 iterations, a last iteration includes invalidating all entries in a last set of entries that all store the same value of the code.

17. The apparatus of claim 13, wherein if one or more matches are found in one of the iterations, each entry for which a match is found, based on a comparison of selected bits, is invalidated.

18. The apparatus of claim 17, wherein no further iterations are performed after the first iteration in which one or more matches are found.

19. The apparatus of claim 13, wherein there are N different page sizes, and M<N.

20. The apparatus of claim 13, wherein each code uniquely represents a different page size, and the comparing includes comparing first selected bits of the invalid virtual address with first selected bits of each of the virtual addresses associated with respective entries in the virtual-address cache module, where the first selected bits are determined by using the code as a mask that depends on a page size represented by the code.

21. The apparatus of claim 13, wherein the virtual-address cache module is one of: a data cache, an instruction cache, or a page table walker cache.

22. The apparatus of claim 13, wherein the virtual-address cache module is configured to receive at least a portion of a virtual address and in response indicate a hit if a memory block associated with a corresponding virtual address is presently stored in the virtual-address cache module without requiring translation of the corresponding virtual address to a physical address.

23. The apparatus of claim 22, wherein the virtual-address cache module is virtually tagged such that the virtual-address cache module determines whether to indicate a hit or a miss for a particular virtual address based on a tag that includes a portion of the particular virtual address and is compared with tags of multiple entries.

24. The apparatus of claim 23, wherein the virtual-address cache module is virtually indexed such that the virtual-address cache module determines whether to indicate a hit or a miss for a particular virtual address based on an index that includes a portion of the particular virtual address and is used to look up one of multiple entries or sets of entries.

\* \* \* \* \*